United States Patent
Katayama et al.

[11] Patent Number: 5,266,277
[45] Date of Patent: Nov. 30, 1993

[54] FLUIDIZED BED GAS DISPERSING DEVICE

[75] Inventors: Hideshi Katayama; Hiroshi Itaya; Masahiko Satoh; Kazuo Kimura, all of Chiba, Japan

[73] Assignee: Kawasaki Steel Corporation, Kobe, Japan

[21] Appl. No.: 721,629

[22] PCT Filed: Dec. 6, 1990

[86] PCT No.: PCT/JP90/01589
§ 371 Date: Jul. 18, 1991
§ 102(e) Date: Jul. 18, 1991

[87] PCT Pub. No.: WO91/09261
PCT Pub. Date: Jun. 27, 1991

[30] Foreign Application Priority Data
Dec. 8, 1989 [JP] Japan .................. 1-317824

[51] Int. Cl.⁵ .................. F27B 15/10; C21B 13/00
[52] U.S. Cl. .................. 422/143; 422/311; 110/245
[58] Field of Search .......... 422/311, 143; 34/57 A; 110/245; 122/4 D; 431/7, 170

[56] References Cited

U.S. PATENT DOCUMENTS 2,646,170  7/1953  Jackson .................. 422/270
4,258,005  3/1981  Ito et al. .................. 422/143

FOREIGN PATENT DOCUMENTS 107185      6/1984  Japan .
59-107185   6/1984  Japan .
62-29094    2/1987  Japan .

Primary Examiner—Robert J. Warden
Assistant Examiner—Stephanie Smith
Attorney, Agent, or Firm—Dvorak and Traub

[57] ABSTRACT

Disclosed herein is a gas dispersing device to be employed in a fluidized bed preliminary reducing furnace. The gas dispersing device is constructed of a plurality of rotatable round bars arranged in multiple stages so as to form a grate. The gas dispersing device includes a rotating mechanism for rotating each bar.

According to the present invention, deformation of the bars due to a temperature change thereof can be avoided to thereby extend a life of the dispersing device. Furthermore, blinding of the dispersing device can be prevented to thereby effectuate a stable operation of a fluidized bed. Accordingly, productivity in the fluidized bed reducing furnace is improved, and labor saving is realized.

8 Claims, 4 Drawing Sheets

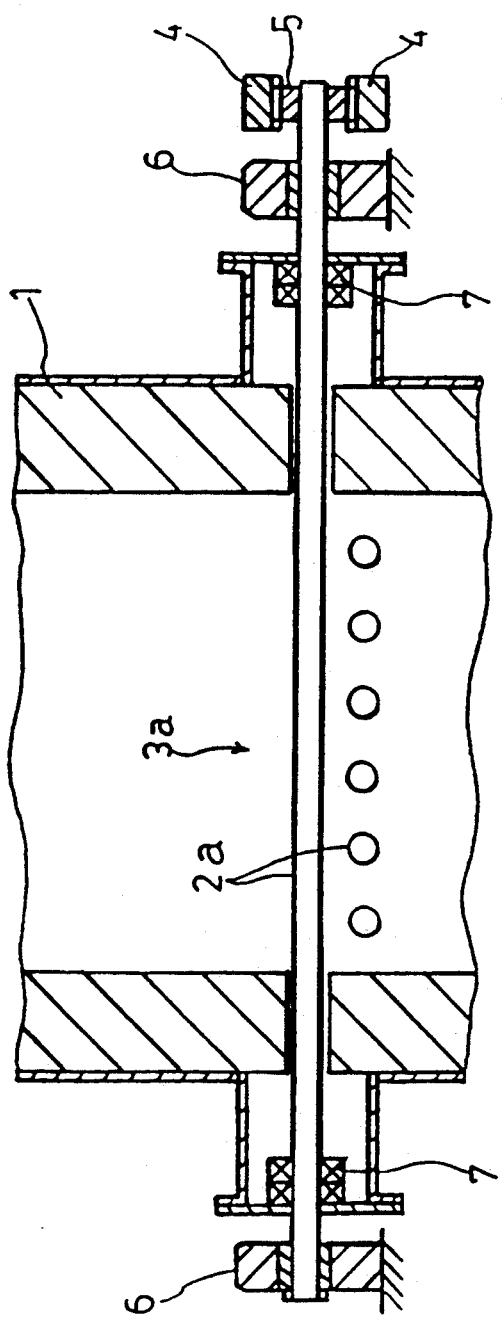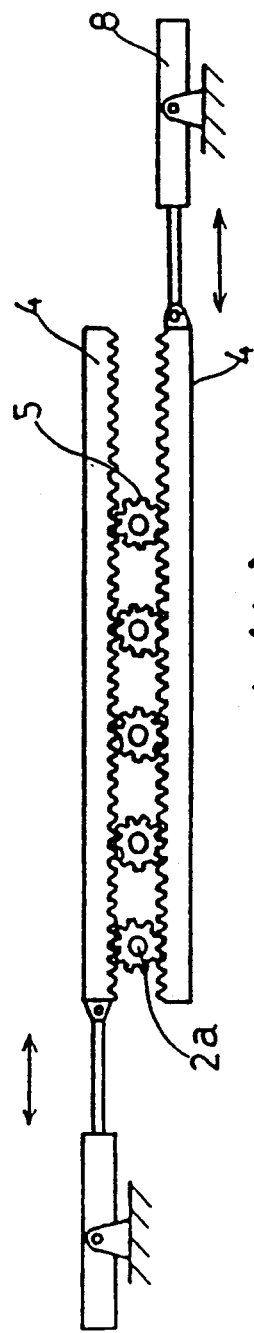
FIG.1 (a)
FIG.1 (b)

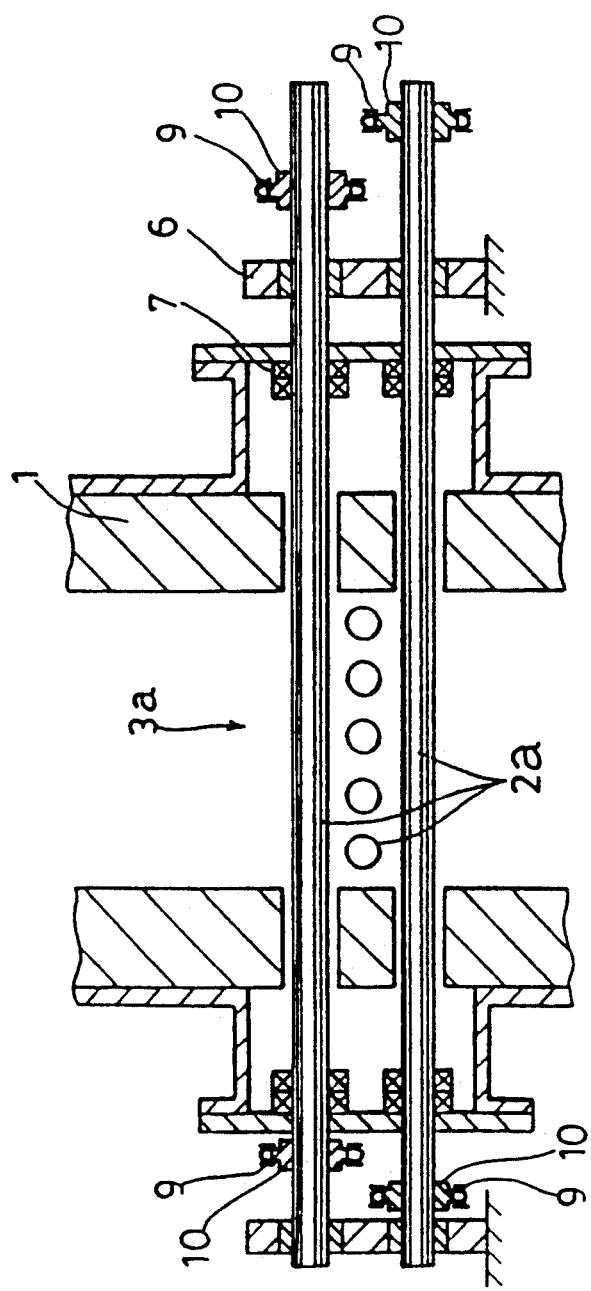
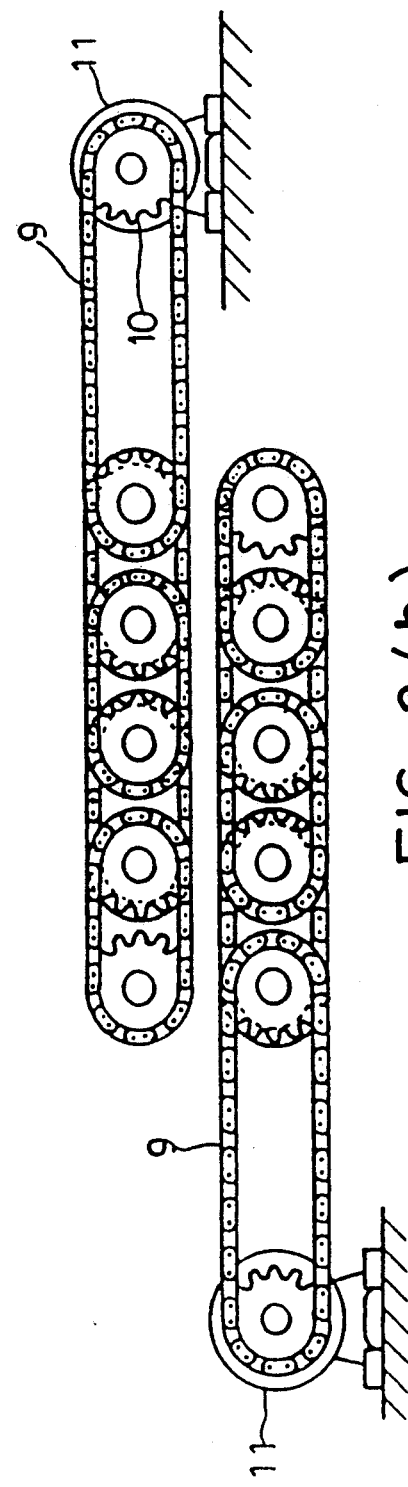
FIG. 2(a)
FIG. 2(b)

FLUIDIZED BED GAS DISPERSING DEVICE

TECHNICAL FIELD

The present invention relates to a fluidized bed gas dispersing device for use with a fluidized bed preliminary reducing furnace for iron ore, chrome ore, etc.

BACKGROUND ART

In metal ore resources inclusive of iron ore, a proportion of massive ore tends to decrease, and a proportion of powdery or tends to increase. At present, concentration such as flotation or magnetic separation is positively developed, so as to improve a grade of a low-grade ore in particular. Accordingly, such a tendency as mentioned above is anticipated to be marked more and more later.

There has been recently developed a so-called melt reduction process for producing a molten metal directly from a powdery ore. The melt reduction process comprises the steps of preliminarily reducing the powdery ore in a fluidized bed preliminary reducing furnace, then introducing the preliminarily reduced powdery ore obtained above into a melt reducing furnace filled with a carbonaceous solid reducing agent, and reducing and liquefying the preliminarily reduced powdery ore in the melt reducing furnace to produce the molten metal.

In the case that an inner diameter of the fluidized bed preliminary reducing furnace is large, a gas flow in a fluidized bed becomes nonuniform to cause a difficulty of proper fluidization. Therefore, in order to obtain a uniform gas flow, a gas dispersing plate having many gas dispersing holes is provided at a lower portion of the furnace where an inlet of a reducing gas is formed.

In the case of utilizing a high-temperature gas generated in the melt reducing furnace as the reducing gas for fluidization, there is a problem that the gas dispersing holes of the gas dispersing plate are closed by a large amount of dust contained in the high-temperature gas generated from the melt reducing furnace.

A solution of this problem is disclosed in Japanese Utility Model Laid-open Publication No. 62-29094, for example. FIG. 4 shows a fluidized bed gas dispersing device disclosed in this prior art. Referring to FIG. 4, reference numeral 3 generally designates this fluidized bed gas dispersing device provided in a preliminary reducing furnace 1. The dispersing device 3 is constructed of a plurality of bars 2 movable in a longitudinal direction thereof, which bars 2 are arranged in upper and lower horizontal planes so as to intersect with each other as viewed in plan. In removing a deposited substance 12 such as dust deposited on a surface of each bar 2, the bar 2 is sometimes drawn off, and the deposited substance 2 is then squeezed off.

However this prior art device has a defect that the bars are deformed by heat to result in impossibility of drawing of the bars.

Further, the present applicant has proposed in Japanese Patent Laid-open Publication No. 59-107185 a technique such that deformed bars arranged in rows are rotated to change an opening size between the adjacent ores of the deformed bars.

Thus, this technique is intended to change the opening size between the adjacent deformed bars. However, it is not intended to prevent the opening between the bars from being closed by the dust.

SUMMARY OF THE INVENTION

It is an object of the present invention to provide a fluidized bed gas dispersing device which can prevent the thermal deformation of the bars and also prevent the blinding of the gas dispersing plate due to the dust, thereby extending a life of the bars and stabilizing the fluidized bed.

The fluidized bed gas dispersing device according to the present invention comprises a grate consisting of a plurality of rotatable bars each having a circular cross section, said bars being vertically arranged in rows in a plurality of horizontal planes in such a manner that said bars in the adjacent ones of said horizontal planes intersect each other, and a rotating device for rotating each of said bars.

The bars in the adjacent ones of the horizontal planes may intersect each other at right angles or oblique angles as viewed in plan.

It is preferable that an opening ratio of the grate is 2–10%.

The rotating device may be comprised of a pinion fixed to an end portion of each bar, a rack meshing with the pinion, and a power cylinder for reciprocating the rack.

The rotating device may be comprised of a sprocket fixed to an end portion of each bar, a chain wrapped around the sprocket, and a motor for driving the chain.

The rotating device is preferably constructed as a continuous rotating device. In this case, a rotations speed of each bar to be rotated by the continuous rotating device is preferably set in the range of 0.1–3.0 rpm.

The rotating device may be constructed as an intermittent rotating device.

BRIEF DESCRIPTION OF THE DRAWINGS

FIG. 1 shows a first preferred embodiment of the present invention, wherein FIG. 1(a) is a vertical sectional view of a dispersing plate constructed of two stages of plural movable bars, and FIG. 1(b) is a side view of a rotating device for the movable bars shown in FIG. 1(a);

FIG. 2 shows a second preferred embodiment of the present invention, wherein FIG. 2(a) is a vertical sectional view of a dispersing plate constructed of three stages of plural movable bars, and FIG. 2(b) is a side view of a rotating device for the movable bars shown in FIG. 2(a);

BEST MODE FOR EMBODYING THE INVENTION

Figure 3:
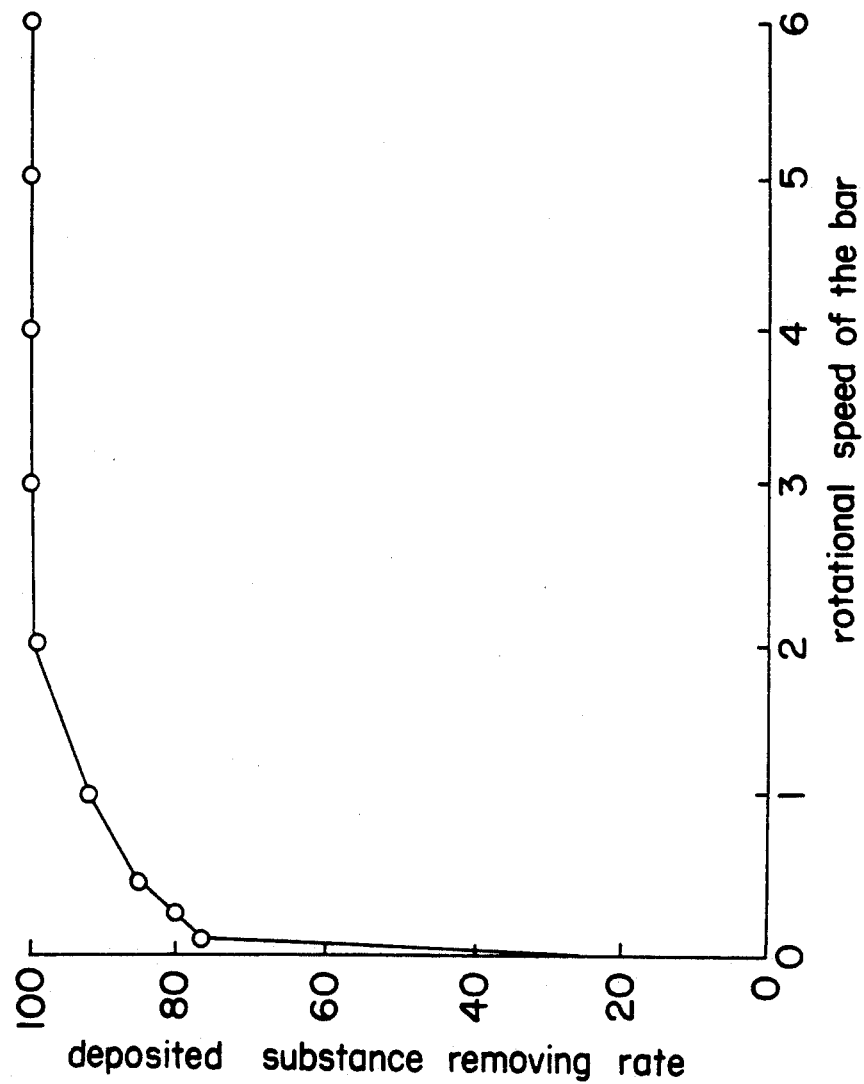
FIG. 3 is a graph showing the operation of the present invention.
Figure 4:
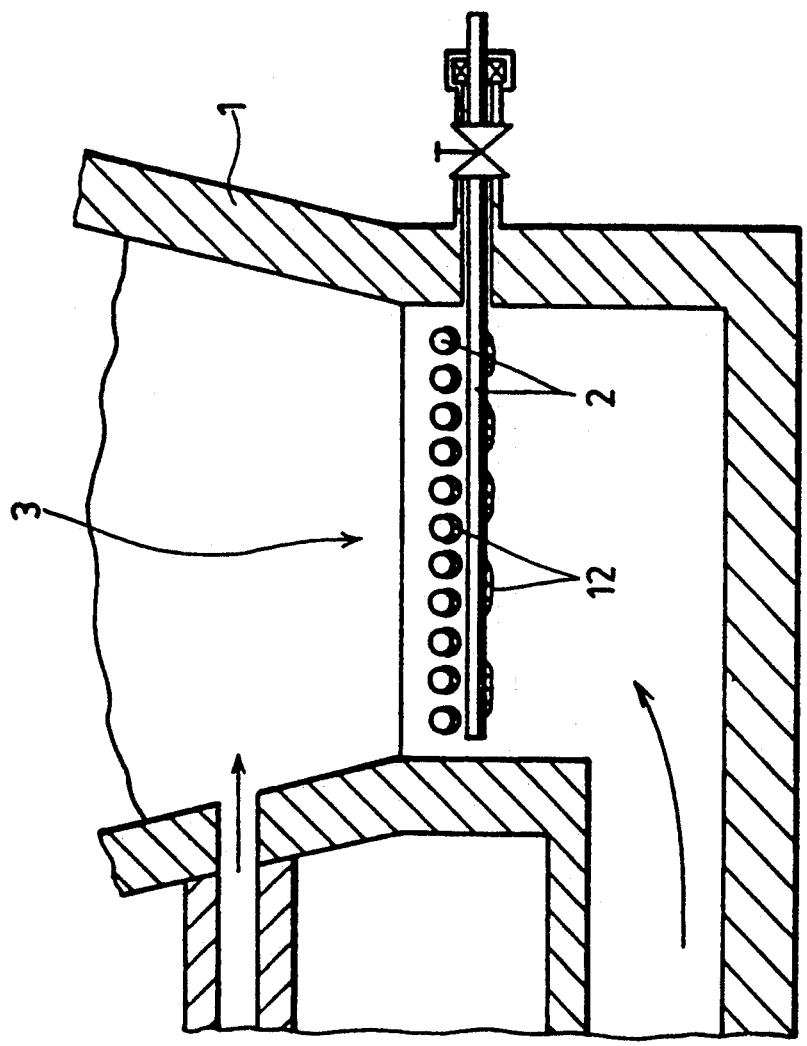
FIG. 4 is a vertical sectional view of the fluidized bed gas dispersing device in the prior art.

According to the present invention, each bar is rotated. The rotation of the bar is advantageous for the following reasons.

(1) A load of powdery ore is placed on the bar in a sectional direction thereof. Further, when a difference in temperature distribution of the bar is generated, the bar is deformed. However, by rotating the bar, the load and the difference in temperature distribution can be averaged to thereby prevent the deformation of the bar.

(2) A dust contained in an introduced reducing gas and particles falling from a fluidized bed are deposited onto the bar. In the case that the bar is at rest, the dust and the particles are deposited onto upper and lower surfaces of the bar rather than side surfaces thereof dependently on the reducing gas rising in the furnace. However, by rotating the bar, the deposition of the dust and the particles onto the entire surface of the bar is avoided.

FIG. 1 shows a first preferred embodiment of the present invention. More specifically, FIG. (a) shows a dispersing plate 3a constructed of two stages of plural movable bars 2a arranged in rows, and FIG. (b) shows a rotating device for the movable bars 2a shown in FIG. 1(a).

As shown in FIGS. 1(a) and 1(b), each movable bar 2a extends through a pair of gas seals 7 out of a preliminary reducing furnace 1, and is rotatably supported at opposite end portions thereof to a pair of bearings 6 provided outside the furnace 1. The movable bars 2a are rotated by the rotating device such that a pinion 5 is fixedly mounted on each movable bar 2a at its one end, and a pair of upper and lower racks 4 meshing with the pinions 5 are reciprocally moved by a pair of right and left cylinders 8.

FIG. 2 shows a second preferred embodiment of the present invention. More specifically, FIG. 2(a) shows a dispersing plate 3a constructed of three stages of plural movable bars 2a arranged in rows, and FIG. 2(b) shows a rotating device for the movable bars 2a shown in FIG. 2(a).

In the second preferred embodiment, the rotating device for each movable bar 2a is constructed of sprockets 10 fixedly mounted on each movable bar 2a at its opposite end portions, chains 9 wrapped around the sprockets 10, and motors 11 for driving the chains 9. Alternatively, belts and pulleys may be substituted for the chains 9 and the sprockets 10.

FIG. 3 is a graph showing the operation of the present invention.

Referring to FIG. 3, the axis of abscissa represents a rotational speed of the bar, and the axis of ordinate represents a deposited substance removing rate. The deposited substance removing rate is defined by the following equation. Deposited Substance Removing Rate $= [(t_1 - t_0)/t_1] \times 100\%$ where, $t_0$ (mm) represents a thickness of a deposited substance deposited onto the bar for a week in the case that the bar is rotated during the operation, and $t_1$ (mm) represents a thickness of the deposited substance deposited onto the bar for a week in the case that the bar is not rotated during the operation.

The graph shown in FIG. 3 is a relation between the rotational speed of the bar and the deposited substance removing rate in the case that the rotation of the bar is continuous. As apparent from FIG. 3, when the rotations speed is less than 0.1 rpm, the effects mentioned above in Paragraphs (1) and (2) are not exhibited, while when the rotations speed exceeds 3.0 rpm, the effects are saturated to uselessly increase a power cost.

Accordingly, the rotations speed is preferably set to 0.1–3.0 rpm in the case of continuously rotating the bar.

Some examples according to the above preferred embodiments will now be described.

(1) The dispersing device according to the first preferred embodiment was operated under the following conditions.
Diameter of the bar: 40 mm
Length of the bar: 1200 mm
Material of the bar: Heat resisting alloy
Rotational speed of the bar: 2.0 rpm
Atmospheric temperature: 980° C.

| Atmospheric gas composition: | $H_2O$ | 20% |
| --- | --- | --- |
| | CO | 45% |
| | $N_2$ | 34% |
| | trace gas | 1% |

One to be reduced: Iron ore (particle size: 5 mm or less)

As a result of this operation, no deposited substance was generated on the bar, and a life of the bar was extended up to six months in comparison with one month in the prior art.

(2) The dispersing device according to the second preferred embodiment was operated under the following conditions.
Diameter of the bar: 30 mm
Length of the bar: 1800 mm
Material of the bar: Heat resisting alloy
Rotations speed of the bar: 1.0 rpm
Atmospheric temperature: 1030° C.

| Atmospheric gas composition: | $H_2$ | 17% |
| --- | --- | --- |
| | $H_2O$ | 0.6% |
| | CO | 32% |
| | $CO_2$ | 1% |
| | $N_2$ | 49% |
| | trace gas | 0.4% |

Vertically projected area of opening defined by the bars: 35×35 mm

As a result of this operation, no deposited substance was generated even when the dispersing plate was used for a year. In contrast, a life of the conventional dispersing plate was one month in average, and in the worst case, a deposited substance was generated in about six days to close the openings of the dispersing plate.

According to the present invention, the following excellent effects are exhibited.

(1) The deformation of the bar is avoided to thereby extend a life of the bar.

(2) The deposited substance on the bar can be removed to thereby effectuate a stable condition of a fluidized bed.

Further, in the case of intermittently rotating the bars, it is preferable to rotate the bars every 5–10 seconds. The opening ratio of the dispersing device is defined as a ratio of the projected opening area of the dispersing device to the total plane area thereof. While the opening ratio is normally 2–5% in a fluidizing device for fine particles, it is preferably set in the range of 2–10% from the viewpoints of prevention of closing of the dispersing device and prevention of falling of the particles through the dispersing device.

We claim:

1. A fluidized bed gas dispersing device for a fluidized bed preliminary reducing furnace, comprising:
a furnace housing;
a first planar grid disposed within said housing and having a first series of regularly spaced parallel bars, said bars each having a circular cross-section;
a second planar grid disposed within said housing and having a second series of regularly spaced parallel bars, said bars each having a circular cross-section, the planar aspect of said second grid being proximately disposed in parallel relation to the planar aspect of said first grid, said bars of said first and second grids being spaced apart to maintain a nonvariable gas flow slit area between bars during rotation of said bars; and means for rotating each of said bars of said first and second grids to remove dust accumulation on the bars and to prevent heat deformation of the bars.

2. The fluidized bed gas dispersing device of claim 1, wherein said bars of said first and second grids form a lattice structure.

3. The fluidized bed gas dispersing device of claim 2, wherein a ratio of said apertures to a total area of said grate is 2 to 10%.

4. The fluidized bed gas dispersing device of claim 1, wherein said means for rotating said bars comprises:
 a pinion fixed to an end portion of each of said bars;
 a rack meshing with said pinions; and
 a power cylinder for reciprocating said rack.

5. The fluidized bed gas dispersing device of claim 1, wherein said means for rotating said bars comprises:
 a sprocket fixed to an end portion of each of said bars;
 a chain wrapped around said sprocket; and
 a motor for driving said chain.

6. The fluidized bed gas dispersing device of claim 1, wherein said means for rotating said bars are continuous rotating means.

7. The fluidized bed gas dispersing device of claim 6, wherein said continuous rotating means rotates each of said bars in a range of 0.1 to 3.0 rpm.

8. The fluidized bed gas dispersing device of claim 1, wherein said means for said bars are intermittent rotating means.

* * * * *